May 9, 1933.    A. J. COBURN    1,907,506
RETAINER CLIP
Filed June 20, 1931

Inventor
Albert Jacob Coburn
By Spencer, Hardman & Fehr
His Attorneys

Patented May 9, 1933

1,907,506

UNITED STATES PATENT OFFICE

ALBERT JACOB COBURN, OF ANDERSON, INDIANA, ASSIGNOR TO DELCO-REMY CORPORATION, OF ANDERSON, INDIANA, A CORPORATION OF DELAWARE

RETAINER CLIP

Application filed June 20, 1931. Serial No. 545,819.

This invention relates to a retainer clip, and more particularly to clips that are utilized to retain a bushing or a pivotal member upon its pivot.

An object of the present invention is to provide a retainer clip of resilient material which will be light in weight, economical to manufacture, which can be easily formed to shape with few operations and which will withstand the shocks and strains imposed upon it.

Further objects and advantages of the present invention will be apparent from the following description, reference being had to the accompanying drawing wherein a preferred embodiment of one form of the present invention is clearly shown.

Figure 1:
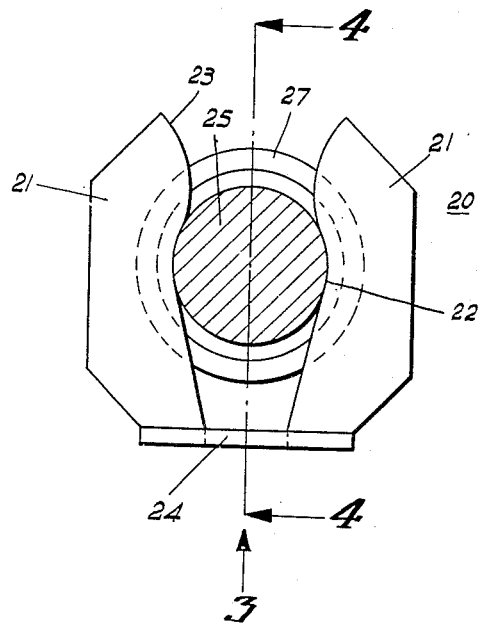
Fig. 1 is a sectional plan elevational view of a retainer clip as applied to a grooved member.

Referring to the drawing, a retainer clip 20 is made from a single piece of spring steel sheet metal of suitable and uniform thickness. The clip comprises a pair of rigid arms or projections 21 having diametrically opposed recesses or notches defined by concave surfaces 22 forming engaging surfaces, to which access is had through a tapered opening defined by convex edges 23 on the arms 21. The arms 21, which are spaced apart are provided with an integral and resilient yoke 24. The yoke 24 is bent into a transverse position with respect to the arms and at right angles so that the metal thickness or short dimension of the yoke is parallel with the plane of the arms, thus providing a resilient yoke exhibiting a greater degree of elasticity than would exist in a yoke of the same cross sectional dimensions if the yoke were located with its longer cross sectional dimensions parallel to the plane of the arms. The yoke 24 also provides accessible means whereby pliers or other suitable mechanism may be used to grasp it to insert or remove the clip as desired.

One of the uses of the clip 20 is illustrated in the drawing. In order to retain a bushing 27 or the like upon a stud 25, the stud is provided with a clip receiving groove the bottom of which is defined by the portion 26 of lesser diameter than the main portion of the stud. The width of the groove is of course slightly greater than the thickness of the arms 21.

Figure 2:
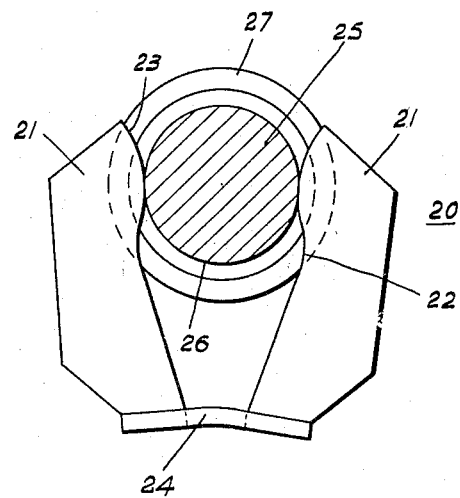
Fig. 2 is a sectional plan elevation view illustrating the flexing of the retainer clip when being inserted upon or being removed from a grooved member.
Figure 3:
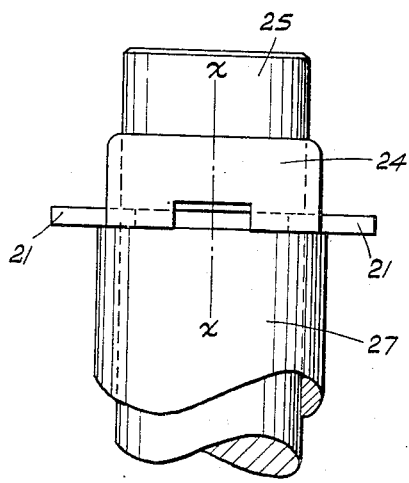
Fig. 3 is a view looking in the direction of the arrow 3 of Fig. 1.
Figure 4:
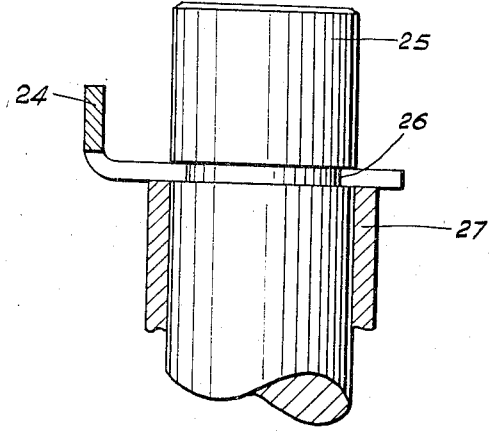
Fig. 4 is a sectional view taken on the line 4—4 of Fig. 1.

In assembling the clip to a stud or the like, as illustrated in Fig. 2, it will be apparent that the diametrically opposed convex edges 23 engage the bottom portion 26 of the receiving groove of the stud, the edges 23 forming cams to spread the arms 21 outwardly against the tension of the yoke 24, the yoke bending about an axis perpendicular to the plane of the arms 21 as indicated by the line $x$—$x$ of Fig. 3. The stress exerted upon the yoke 24 will not be beyond the elastic limit of the yoke. As the clip is further forced upon the stud, the concave surfaces 22 engage the smaller diameter of the stud, which is greater in diameter than the distance between the concave surfaces of the arms 21 when the arms are in their normal or free position. Thus there is a tension upon the arms 21 due to the resilient yoke not being returned to its unsprung position when the clip is assembled upon the stud, whereby the clip is held in a firm, but yieldable gripping relation with respect to the stud. This gripping action operates to retain the clip upon the stud so that the clip will not be removed easily by accidental agencies, and intentional pull will be required to force the arms 21 sufficiently far apart to permit the stud to slip out of the gripping surfaces of the arms 21.

It is obvious from the description that has preceded that the present invention provides a retainer clip of simple and durable construction. It is durable for the reason that the yoke is bent at right angles to the plane of the arms 21, thus providing a resilient yoke having a greater degree of elasticity than would exist in a yoke if the yoke were located within the same plane of the arms 21. Since the yoke is so constructed and arranged that it can be bent to a considerable degree without exceeding the elastic limit the arms 21 may be spread many times without appreciably lessening the resiliency of the clip. Therefore, the clip may be used indefinitely as the chance of destroying the tension of the yoke is very slight. The yoke 24 thus provides means that are more accessible for the application of tools to attach the clip to a stud, and to remove the clip from the stud.

While the form of embodiment of the present invention as herein disclosed, constitutes a preferred form, it is to be understood that other forms might be adopted, all coming within the scope of the claim which follows.

What is claimed is as follows:

A retainer clip adapted to engage a cylindrical body and comprising a resilient sheet metal structure having two spaced arms lying in one plane and a connecting yoke of oblong cross section lying in a plane substantially at right angles to the plane of the arms, said arms providing, intermediate their ends, two facing concave edges adapted to be sprung against the cylindrical body, said arms having, nearer their ends, two facing convex edges spaced apart a distance substantially less than the diameter of the body, the forcing of the arms apart by the engagement of the body and the convex edges causing the yoke to bend without permanently distorting the clip about an axis at right angles to the plane of the arms and parallel to the longer cross-sectional dimension of the yoke.

In testimony whereof I hereto affix my signature.

ALBERT JACOB COBURN.